Figure 1:
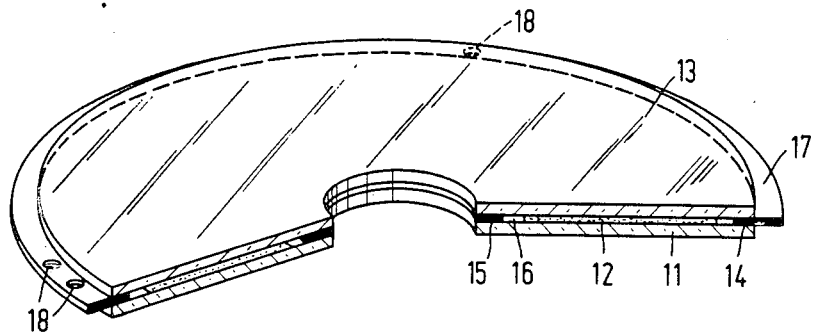

United States Patent [19]

Hoogeveen et al.

[11] Patent Number: 4,622,661
[45] Date of Patent: Nov. 11, 1986

[54] OPTICALLY READABLE STORAGE DISC

[75] Inventors: Leonardus P. J. Hoogeveen; Hendrikus W. C. M. Peeters; Aloysius M. J. M. Spruijt, all of Eindhoven, Netherlands

[73] Assignee: Optical Storage International Holland, Eindhoven, Netherlands

[21] Appl. No.: 700,233

[22] Filed: Feb. 11, 1985

Related U.S. Application Data

[63] Continuation-in-part of Ser. No. 617,006, Jun. 4, 1984, abandoned.

[30] Foreign Application Priority Data

Feb. 14, 1984 [NL] Netherlands ................ 8400477

[51] Int. Cl.$^4$ .................... G11B 7/00; G11B 3/70; G11B 5/82; G11B 25/04
[52] U.S. Cl. ................... 369/280; 74/573 R; 346/137; 360/135; 360/137

[58] Field of Search .............. 369/286, 285, 284, 283, 369/280; 346/135.1, 137; 360/135, 137; 74/573 R

[56] References Cited

U.S. PATENT DOCUMENTS

| | | | |
|---|---|---|---|
| 3,838,464 | 9/1974 | Doyle | 74/573 |
| 3,854,347 | 12/1974 | Hellerich | 74/573 |
| 4,074,282 | 2/1978 | Balas et al. | 346/76 L |
| 4,300,803 | 11/1981 | Chorosevic | 74/573 R |
| 4,376,963 | 3/1983 | Knoop et al. | 360/135 |
| 4,510,508 | 4/1985 | Jonssen | 369/284 |

Primary Examiner—Steven L. Stephan
Attorney, Agent, or Firm—David R. Treacy

[57] ABSTRACT

An interchangeable optically readable storage disk has a substrate with a recording surface, and a cover thereon which may comprise a second substrate with a further recording layer. The disk includes a protecting arrangement at the circumference of the substrate, which includes a balancing arrangement. The balancing may be effected by apertures in the protecting arrangement, or balancing masses affixed thereto.

12 Claims, 6 Drawing Figures

OPTICALLY READABLE STORAGE DISC

This application is a continuation-in-part of application Ser. No. 617,006 filed June 4, 1984, and now abandoned.

The invention relates to an interchangeable optically readable storage disc, comprising:

a flat transparent substrate having flat sides and a circular periphery, a recording layer which can be modified locally by a radiation beam and which is situated on a flat side of the substrate, a cover which is secured to a flat side of the substrate near the circumference by annular means at a distance from at least that part of the recording layer which is intended for recording, in such a way that a space is enclosed between the substrate and the cover, and protective circumferential portions which form part of the annular means and which comprise an outer edge portion with an external diameter which is larger than that of the circumference of the substrate.

Such a storage disc is disclosed in, for example, Japanese Patent Application No. 57-172541 (Patents Abstracts of Japan, Vol. 7, No. 18(8–170), (1163), Jan. 25, 1983). The storage disc comprises two flat disc-members which are secured to each other by an adhesive with the aid of interposed concentric annular means in the form of annular spacers. These annular means are arranged near a centre hole and near the circumference of the storage disc.

A storage disc which has been used most frequently until now comprises two glass substrates and interposed concentric annular spacers which are secured to each other by means of an adhesive, see U.S. Pat. No. 4,074,282 (herewith incorporated by reference). On the side which faces the sealed space each of the glass substrates is provided with a recording layer. Thus a two-sided storage disc is obtained, one substrate serving as the cover for the other substrate. Another storage disc of the specified type is described in the applicant's previously filed patent applications Ser. No. 490,801 filed May 2, 1983 and Ser. No. 485,530 filed June 15, 1983. This storage disc comprises only one transparent substrate. The cover is made of a thin aluminium sheet material and the annular means are integral with the cover. The cover is hat-shaped, the brim of the hat having the function of said annular means and the other portion being spaced from the substrate.

Especially when glass substrates are employed problems may arise due to the eccentric location of the mass centre of the storage disc. This may be attributed to various causes. Firstly, glass has a comparatively high specific mass, so that slight eccentricities are liable to give rise to comparatively large out-of-balance forces. A second cause is that it is difficult to manufacture a glass substrate having a perfectly plane parallel shape. The cross-section of the substrate will be substantially wedge-shaped, resulting in an eccentric mass distribution of the substrate. A further cause is the fact that storage discs comprising glass substrates may have diameters of up to substantially 30 cm and are rotated with comparatively high speeds up to 25 or 30 revolutions/sec. In the case of a one-sided storage disc, even if it is not made of glass but for example of a plastic, it is rather difficult to ensure that the mass centre coincides exactly with the geometrical centre. When a plurality of disc members, such as a substrate and a cover or two substrates are secured to each other, the problems multiply.

The invention aims at providing an interchangeable optically readable storage disc of the type specified in the opening paragraph with a minimal eccentricity of the mass centre. The invention is characterized in that the protective circumferential means are also employed as balancing means for correcting any eccentric position of the mass centre by locally and selectively removing portions from the circumferential means or by securing balancing mass to the circumferential means.

The advantage of the invention is that the optically readable storage disc is balanced by means of a part which is present anyway, namely the protective circumferential means. In many cases the substrate in itself is not suitable for balancing purposes, for example, for mounting an additional balancing mass on the substrate or, conversely, removing mass from the substrate. This applies in particular to a glass substrate. A part which is separate from the substrate and which is disposed on the circumference of the storage disc is better suited for this purpose.

A further advantage is that balancing is effected at the periphery, where the effect of removing or adding mass is largest. In particular in the case of interchangeable storage discs, to which the scope of the invention is limited, this is an advantage, because these storage discs have no portions near the centre of the disc which may be used for this purpose. In the case of magnetic-disc memories with fixed storage discs balancing may be effected at the location of a central hub (see for example U.S. Pat. No. 3,838,464).

An advantageous embodiment of the invention is characterized in that said annular means and the circumferential means are together constituted by a flat ring. This is the simplest embodiment of the invention. The circumferential means together with the annular means comprise merely a flat ring of minimal mass, so that they contribute only to a small extent to the mass inertia and to the eccentricity of the mass centre of the storage disc.

Another embodiment of the invention is characterized in that the annular means are provided with outer circumferential edge portions which extend perpendicularly to the annular edge portions at some radial distance from the circumference of the substrate and balancing mass is situated against the outer edge portions. Said outer edge portions can take up the centrifugal faces produced by the balancing mass. In this respect an embodiment of the invention may be advantageous, which is characterized in that balancing mass is situated on those sides of the outer edge portions which face the centre of the storage disc. The centrifugal forces now urge the balancing mass against the outer edge portions.

For mounting and securing balancing mass comparatively simple techniques may be used. If the outer edge portions have the shape of an uninterrupted circular outer edge, this provides total freedom as regards the location where balancing mass is removed or added. Preferably, the mass distribution of the storage disc remains substantially symmetrical despite the presence of the circumferential means. This has the advantage that if the storage disc should be balanced on one side only it is irrelevant which side faces upwards during balancing on the balancing machine. Some storage discs are centered on one side with centering means which differ from the centering means for the other side. In that case the storage disc cannot be balanced perfectly and a compromise must be found between the two balancing operations which are necessary. Therefore, it is important that balancing mass can be removed or added on each of the two sides of the storage disc.

The invention will now be described in more detail, by way of example, with reference to the drawings in which FIGS. 1 to 6 are perspective, and partly sectional views of six interchangeable optically readable storage discs embodying the invention.

In the various FIGS. corresponding parts bear the same reference numerals to which the figure number has been prefixed.

The storage disc shown in FIG. 1 comprises a transparent substrate 11 on which a recording layer 12 has been deposited, which layer can be modified by a radiation beam. The cover 13 is secured to the substrate 11 at some distance from the recording layer by annular means 14 and 15, so that a sealed space 16 is enclosed between the substrate and the cover disc. The cover 13 is identical to the transparent substrate 11 and has also been provided with a recording layer, not shown. Thus, a two-sided storage disc is obtained, one substrate forming a cover for the other substrate. The annular means 14 and 15 comprise concentric annular spacers as disclosed in the afore-mentioned U.S. Pat. No. 4,074,282. The annular spacer 14 comprises a portion 17 which projects from the circumference of the two substrates 11 and 13 and which serves as a balancing means for correcting any eccentric position of the mass centre of the storage disc. For this purpose holes 18 may be formed locally in the portion 17, so that material is removed locally. In many cases the mass of the portion 17 is low in comparison with the total mass of the storage disc, so that the local removal of portions of the circumferential means has a comparatively small influence on the location of the mass centre of the storage disc. In such a case the embodiment shown in FIG. 1 may be modified slightly by securing balancing mass, for example lead, to the portion 17, if desired by use of the holes 18. The holes 18 may then be used for anchoring the balancing mass to the portion 17.

Figure 2:
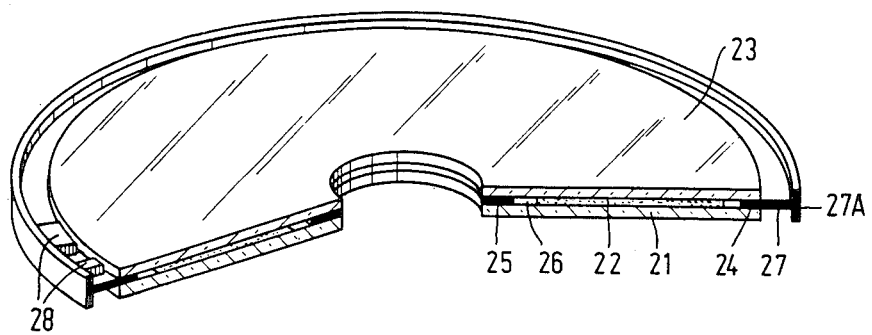

The storage disc shown in FIG. 2 is a modification of the storage disc shown in FIG. 1. The difference is that the protective circumferential means 27 are provided with circumferential outer edge portion 27A which extends perpendicularly to the annular edge portion at some radial distance from the substrates 21 and 23, as known per se in a different version from the above-mentioned Japanese Patent Application No. 57-172541. The balancing means comprise balancing mass in the form of separate balancing portions 28 arranged on the inner side against the outer circumferential portion 27A. The circumferential outer edge portion constitutes an uninterrupted cylindrical wall which extends equally far to both sides of the annular surface. In this way the storage disc has a symmetrical construction and balancing mass may be arranged on both sides of the storage disc. In practice this will often be necessary in the case of a storage disc which, like the storage disc shown in FIG. 2, comprises two separate substrates if the substrates are made of a comparatively heavy material such as glass. Balancing is effected on a balancing machine by first providing one side of the storage disc with balancing portions 28 during this balancing operation. Subsequently, the storage disc is placed on the balancing machine in the turned-over position. The storage disc is always centred in the centre hole of the relevant substrate, so that after the storage disc has been turned over, it must be possible to correct the balancing already performed. This may be effected by mounting further balancing portions on the second side of the storage disc.

Figure 3:
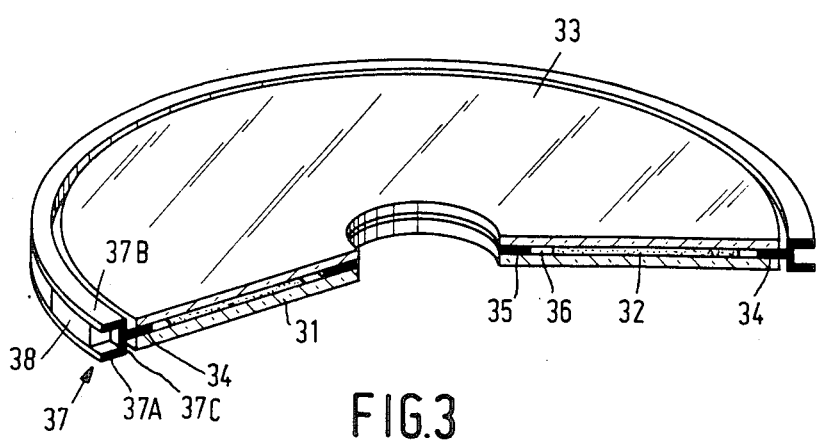

In principle many modifications of the storage disc shown in FIGS. 1 and 2 are possible. FIG. 3 shows an example of such a modification. The annular outer edge portion 37 now has a different shape. In cross-section the assembly comprising the annular means 34 and the outer edge portion 37 has the shape of a fork. The balancing mass may be arranged between the flanges 37A and 37B.

Figure 4:
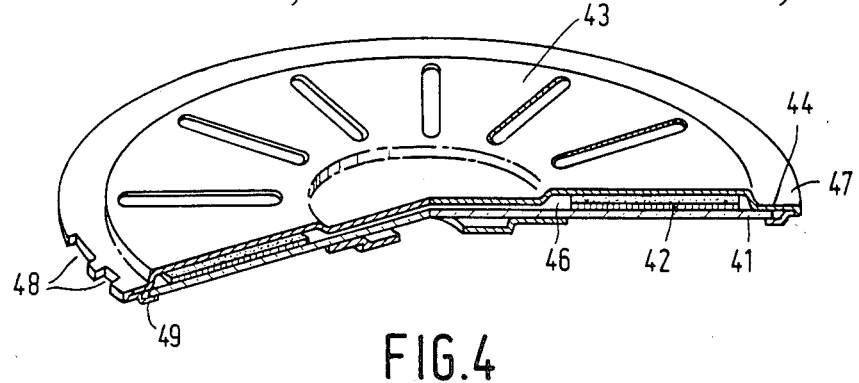
Figure 5:
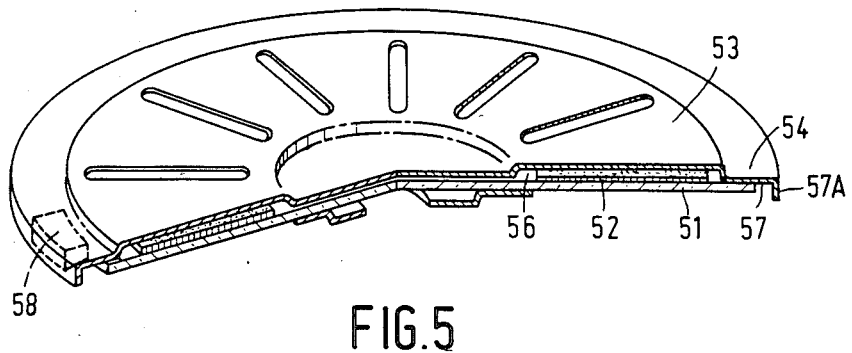
Figure 6:
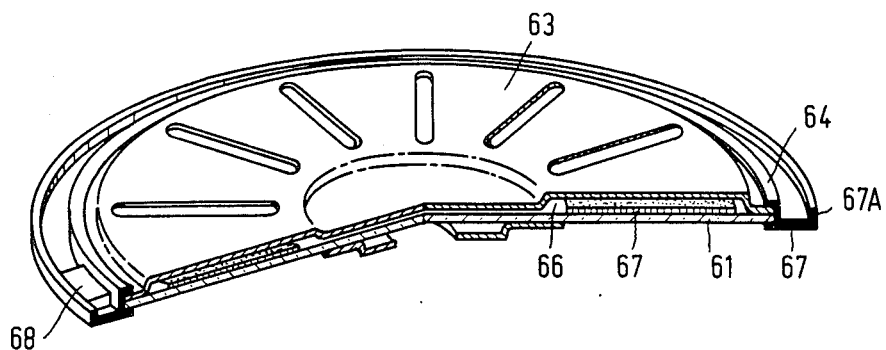

FIGS. 4, 5 and 6 relate to embodiments of the invention which are based on an optically readable storage disc as desired in the Applicant's aforementioned previous patent application Ser. No. 490,801 and Ser. No. 485,530.

FIG. 4 shows a substrate 41 made of glass or a transparent plastic provided with a recording layer 42. A hat-shaped cover 43 made of thin aluminium sheet or another suitable material is secured to the substrate 41 so as to enclose a sealed space 46 between the substrate and the cover. The brim 44 of the hat-shaped cover 43 constitutes an annular means and is secured to the substrate 41 by means of an adhesive. On its circumference the brim 44 has circumferential means in the form of an annular edge portion 47 which is employed for balancing the storage disc. It comprises a crimped portion of the cover disc 43, which adjoins a portion 49 which is sprung over the edge of the substrate 41. For the purpose of balancing the storage disc holes 48 may be formed in the outer rim 47 by means of a suitable operation such as, for example, grinding or nibbling.

In the modification shown in FIG. 5 the circumferential means 57 is provided with a circumferential cylindrical outer rim 57A. Between this outer rim and the substrate, centring mass in the form of centring portions 58 may be arranged in the same way as with the storage disc shown in FIG. 2.

The modification shown in FIG. 6 uses annular means which are separate from the cover disc 63 and which clamp the substrate 61 and the cover disc 63 onto each other at their circumference. There are provided circumferential means 67 with a cylindrical outer rim 67A, so that in the same way as the storage disc shown in FIG. 2 balancing mass in the form of balancing portions 68 may be arranged on the inner side of the outer rim.

Within the scope of the invention many modifications are possible in which the protective circumferential means which are present anyway for securing the cover to the substrate may be used for balancing the storage disc.

In order to avoid thermal stresses in the substrate or substrates or damage as a result of shocks or falling, it may often be desirable to construct the protective circumferential means in a manner as described in Applicant's patent application Ser. No. 623,048 filed June 21, 1984, (herewith incorporated by reference). According to said application care is taken that between the circumference of the substrate and the circumferential means a space is formed in which substantially no intermediate means are present which in the case of deformation of said outer edge can transmit a force which is directed towards the centre of the storage disc to the circumference of the substrate or substrates and which has such a magnitude that it may cause damage to the substrate.

The presence of the balancing portions 28, 58 and 68 will generally be acceptable in this respect, because only over a very small part of the circumference of the storage disc these portions can give rise to forces which act on the circumference of the substrate. However, as is shown in FIG. 2, it is even better to provide some space between the balancing portions and the circumference of the substrate. The embodiment shown in FIG. 3 is also favourable in this respect.

What is claimed is:

1. In an interchangeable optically readable storage disc comprising
   a flat transparent substrate having flat sides and a circular periphery,
   a recording layer adapted to be locally modified by a radiation beam, said recording layer being on one of said flat sides of said substrate,
   a cover means secured to said flat side of said substrate adjacent the circumference thereof in an annular region spaced radially from at least that part of said recording layer to be recorded, whereby a space is provided between said cover and substrate at the circumference of said recording layer, said cover means defining a protective circumferential portion thereof having an outer edge portion with an external diameter larger than that of the circumference of said layer;
   the improvement wherein said protective circumferential portion comprises balancing means for correcting eccentric positioning of the mass center of said disc, said balancing means comprising annular means extending radially outward of the periphery of said substrate and having locally and selectively removed portions.

2. The storage disc of claim 1 wherein said cover means comprises an annular spacer having one side thereof affixed to said substrate and a cover affixed to the other side thereof, said protective circumferential portion comprising a flat annular outward extension of said spacer extending beyond said substrate and cover, said balancing means comprising at least one hole extending axially through said extension outward of the periphery of said cover and substrate and unsymmetrically about the circumference of said extension.

3. The storage disc of claim 2 wherein said cover comprises a transparent substrate having a recording layer adapted to be locally modified by a radiation beam on the side thereof toward said first mentioned substrate.

4. The storage disc of claim 2 further comprising a balancing mass in said hole.

5. The storage disc of claim 1 wherein said cover means comprises a hat-shaped cover having an outer periphery affixed to said substrate and having a portion extending outwardly of said substrate, said balancing means comprising aperture means in the periphery of said outwardly extending portion, said aperture means being unsymmetrical with respect to the circumference of said disc.

6. In an interchangeable optically readable storage disc comprising
   a flat transparent substrate having flat sides and a circular periphery,
   a recording layer adapted to be locally modified by a radiation beam, said recording layer being on one of said flat sides of said substrate,
   a cover means secured to said flat side of said substrate adjacent the circumference thereof in an annular region spaced radially from at least that part of said recording layer to be recorded, whereby a space is provided between said cover and substrate at the circumference of said recording layer, said cover means defining a protective circumferential portion thereof having an outer edge portion with an external diameter larger than that of the circumference of said layer;
   the improvement wherein said protective circumferential portion comprises balancing means for correcting eccentric positioning of the mass center of said disc, said balancing means comprising a radially extending flange means at the outer periphery of said circumferential portion with the radially inner surface thereof defining an annular space, and balancing mass means positioned against the radial inner surface of said flange means unsymmetrically with respect to the circumference of said circumferential portion.

7. The storage disc of claim 6 wherein said cover means comprises an annular spacer having one side thereof affixed to said substrate and a cover affixed to the other side thereof, said flange means comprising an axially extending flange at the outer periphery of said spacer and defining said annular space outwardly of said substrate.

8. The storage disc of claim 7 wherein said cover comprises a second substrate, and further comprising a second recording layer adapted to be locally modified by a radiation beam on the side of said second substrate toward said first mentioned substrate, said flange extending in both axial directions from said spacer, thereby also defining a second annular space outwardly of said second substrate, said balancing means comprising balancing mass means positioned in said second annular space.

9. The storage disc of claim 6 wherein said cover means comprises a hat-shaped cover affixed to said substrate, said cover having a flat portion extending outwardly of said substrate at its periphery, said flange means extending from the periphery of said flat portion whereby said flange means, flat portion and the outer periphery of said substrate define said annular space outwardly of said substrate.

10. The storage disc of claim 6 wherein said cover means comprises a hat-shaped cover abutting said substrate at its outer periphery, and an annular clamp holding said cover against said substrate, said flange means comprising a flange at the outer periphery of said clamp.

11. In an interchangeable optically readable storage disc comprising
   a flat transparent substrate having flat sides and a circular periphery,
   a recording layer adapted to be locally modified by a radiation beam, said recording layer being on one of said flat sides of said substrate,
   a cover means secured to said flat side of said substrate adjacent the circumference thereof in an annular region spaced radially from at least that part of said recording layer to be recorded, whereby a space is provided between said cover and substrate at the circumference of said recording layer, said cover means defining a protective circumferential portion thereof having an outer edge portion with an external diameter larger than that of the circumference of said layer;

the improvement wherein said protective circumferential portion comprises balancing means for correcting eccentric positioning of the mass center of said disc, said balancing means comprising a pair of axially spaced radially extending flange means at the outer periphery of said circumferential portion defining an annular space therebetween, and balancing mass means positioned in said annular space between said flange means and unsymmetrically with respect to the circumference of said circumferential portion.

12. The storage disc of claim 11 wherein said cover means comprises an annular spacer having one side thereof affixed to said substrate, and a second substrate affixed to the other side of said spacer, and further comprising a second layer adapted to be modified by a radiation beam on the side of said second substrate toward said first mentioned substrate, said flange means comprising outer extensions of said annular spacer.

* * * * *